A. PARR.
MACHINE FOR PACKING TEA OR OTHER SUBSTANCES.
APPLICATION FILED JUNE 4, 1912.

1,067,840.

Patented July 22, 1913.
11 SHEETS—SHEET 5.

Witnesses:
Peter Henry
H. D. Penney

Inventor:
Alfred Parr,
By his Attorney,
F. H. Richards.

A. PARR.
MACHINE FOR PACKING TEA OR OTHER SUBSTANCES.
APPLICATION FILED JUNE 4, 1912.

1,067,840.

Patented July 22, 1913.
11 SHEETS—SHEET 6.

Witnesses:
Peter Heney.
H. D. Penney.

Inventor:
Alfred Parr.
By his Attorney,
F. H. Richards.

A. PARR.
MACHINE FOR PACKING TEA OR OTHER SUBSTANCES.
APPLICATION FILED JUNE 4, 1912.
1,067,840.
Patented July 22, 1913.
11 SHEETS—SHEET 7.
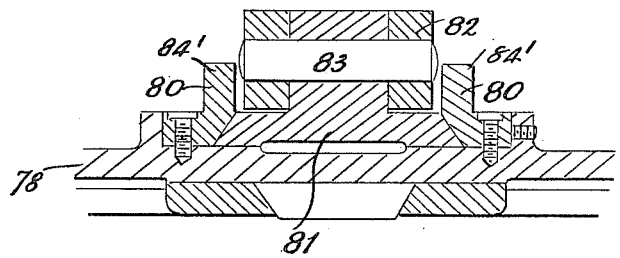
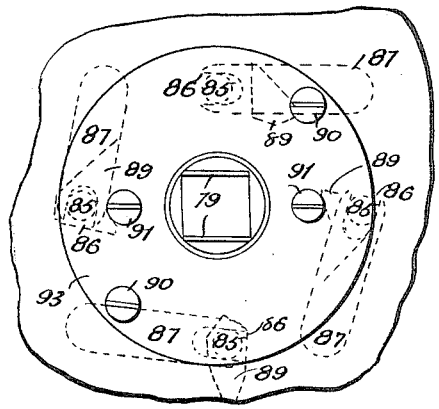
Witnesses:
Peter Henry.
H. D. Penney
Inventor:
Alfred Parr.
By his Attorney,
J. H. Richards

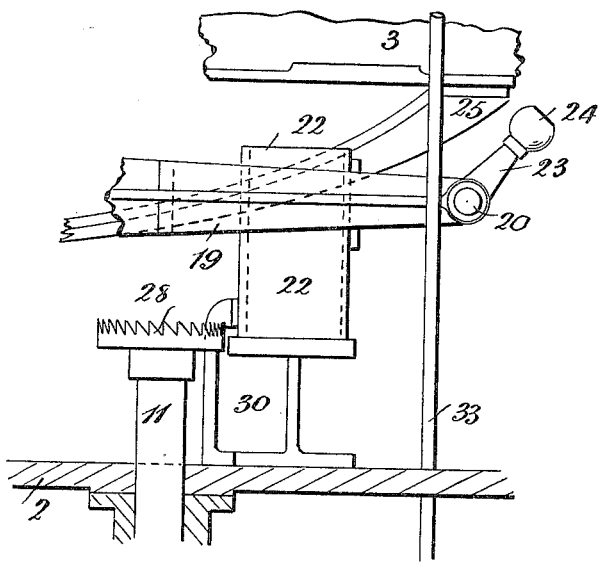
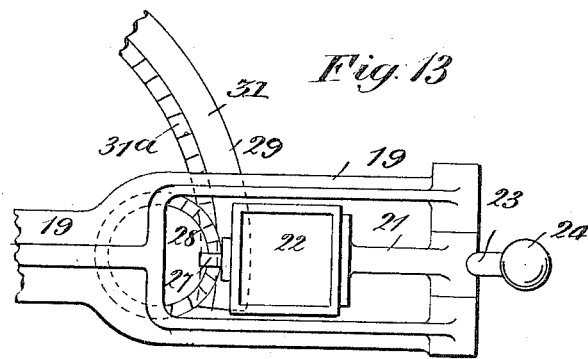

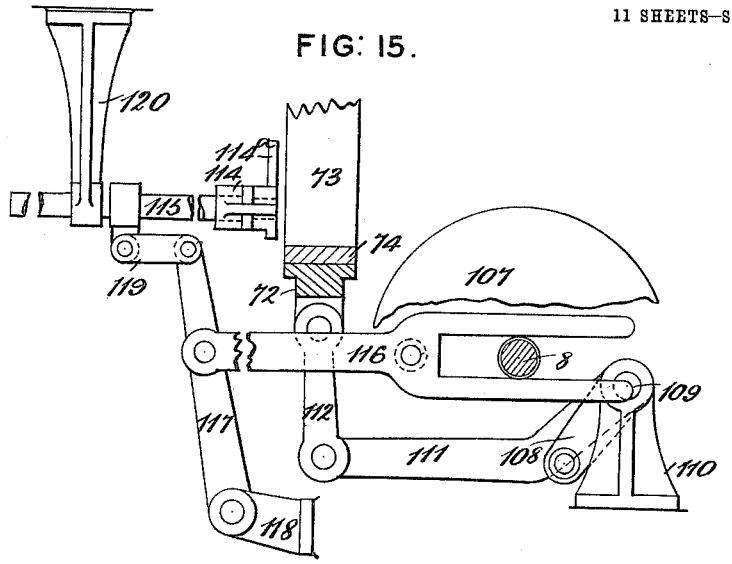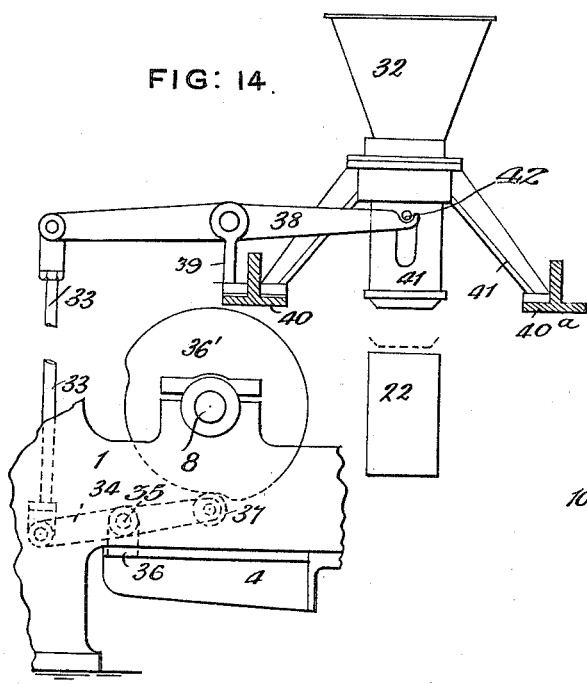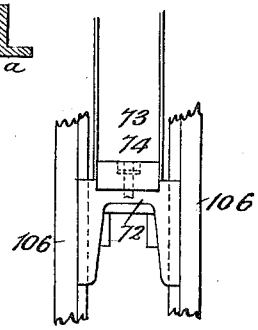

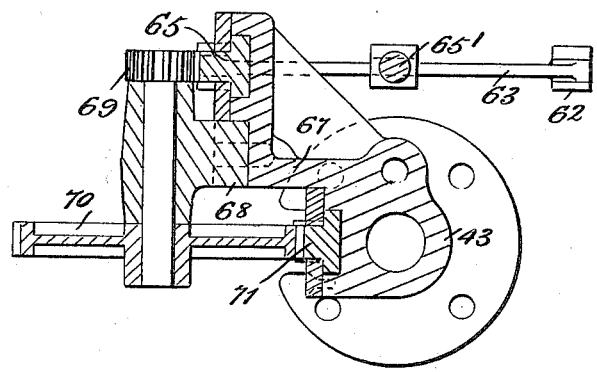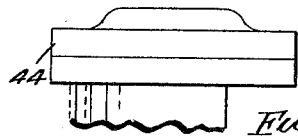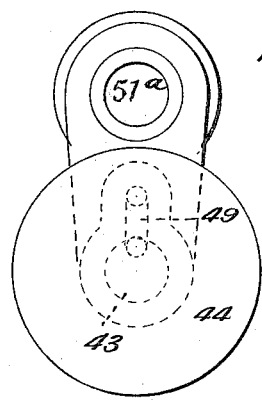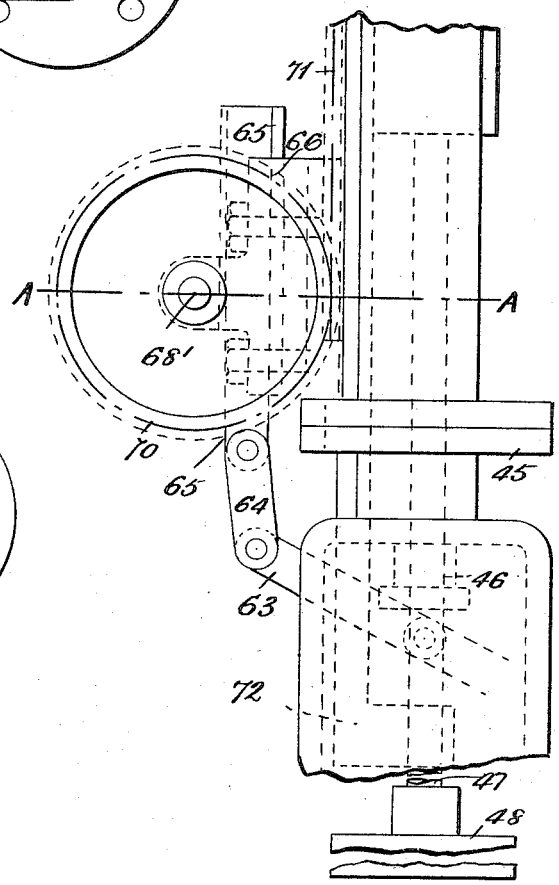

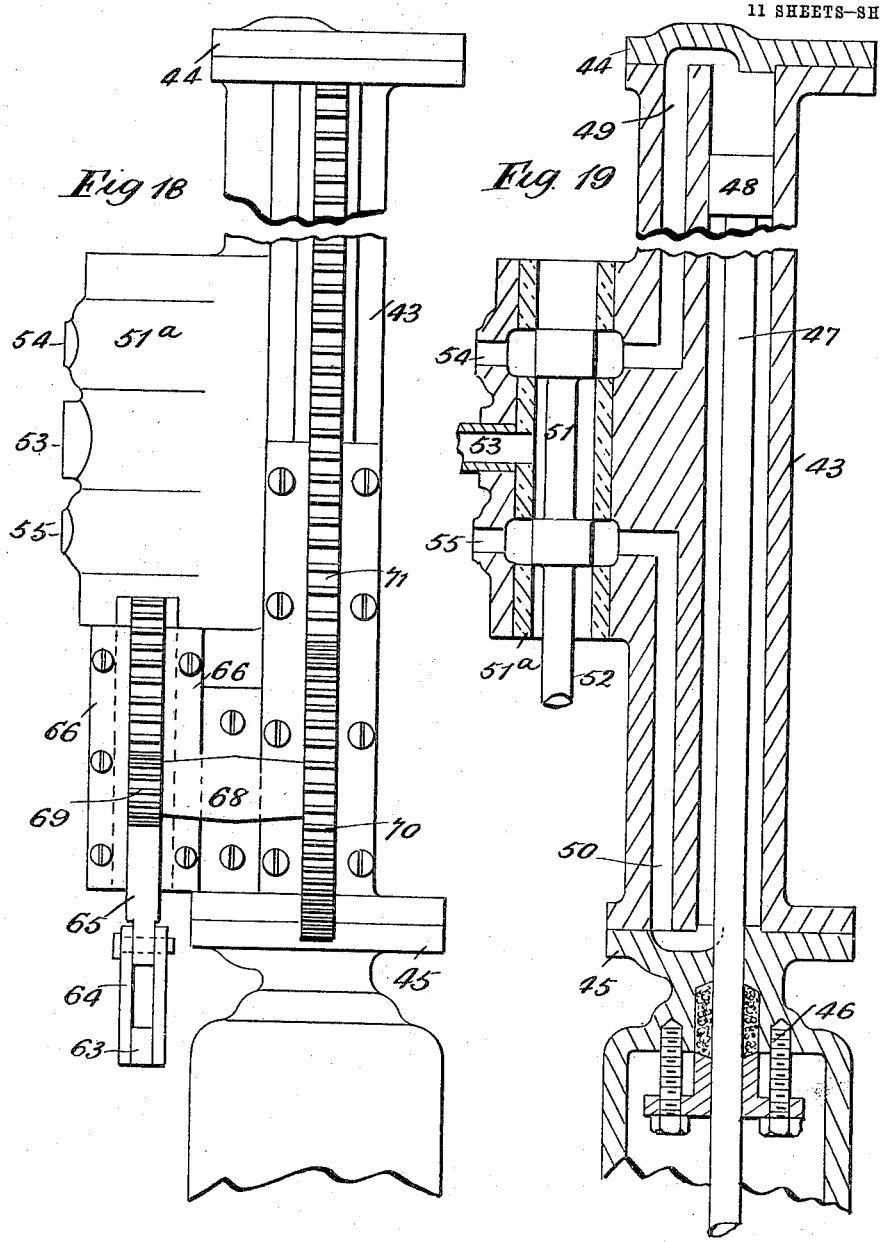

UNITED STATES PATENT OFFICE.

ALFRED PARR, OF WEST NORWOOD, LONDON, ENGLAND.

MACHINE FOR PACKING TEA OR OTHER SUBSTANCES.

1,067,840.    Specification of Letters Patent.    Patented July 22, 1913.

Application filed June 4, 1912. Serial No. 701,546.

*To all whom it may concern:*

Be it known that I, ALFRED PARR, a subject of the King of Great Britain, residing in West Norwood, London, England, have invented certain new and useful Improvements in Machines for Packing Tea or other Substances, of which the following is a specification.

This invention relates to an improved machine for packing tea or other substances, and it has for its object to provide an efficient machine for the purposes specified, the construction and arrangement of which is such that the one machine may be employed for filling and closing of paper bags or cartons of various capacities, the alteration and substitution of parts necessary for the different sizes being effected in a rapid manner, and with a minimum of trouble.

Now according to the present invention, I construct and arrange the folders and such other parts as are required to actually operate upon the filled bag or carton in a manner such that they may be readily removed and replaced by others which are specially adapted for the size of the bag to be filled and closed.

The invention further provides the various improvements and novel features hereinafter fully described and pointed out in the claims.

In order that the invention may be the better understood, drawings are appended in which:—

Figure 1:
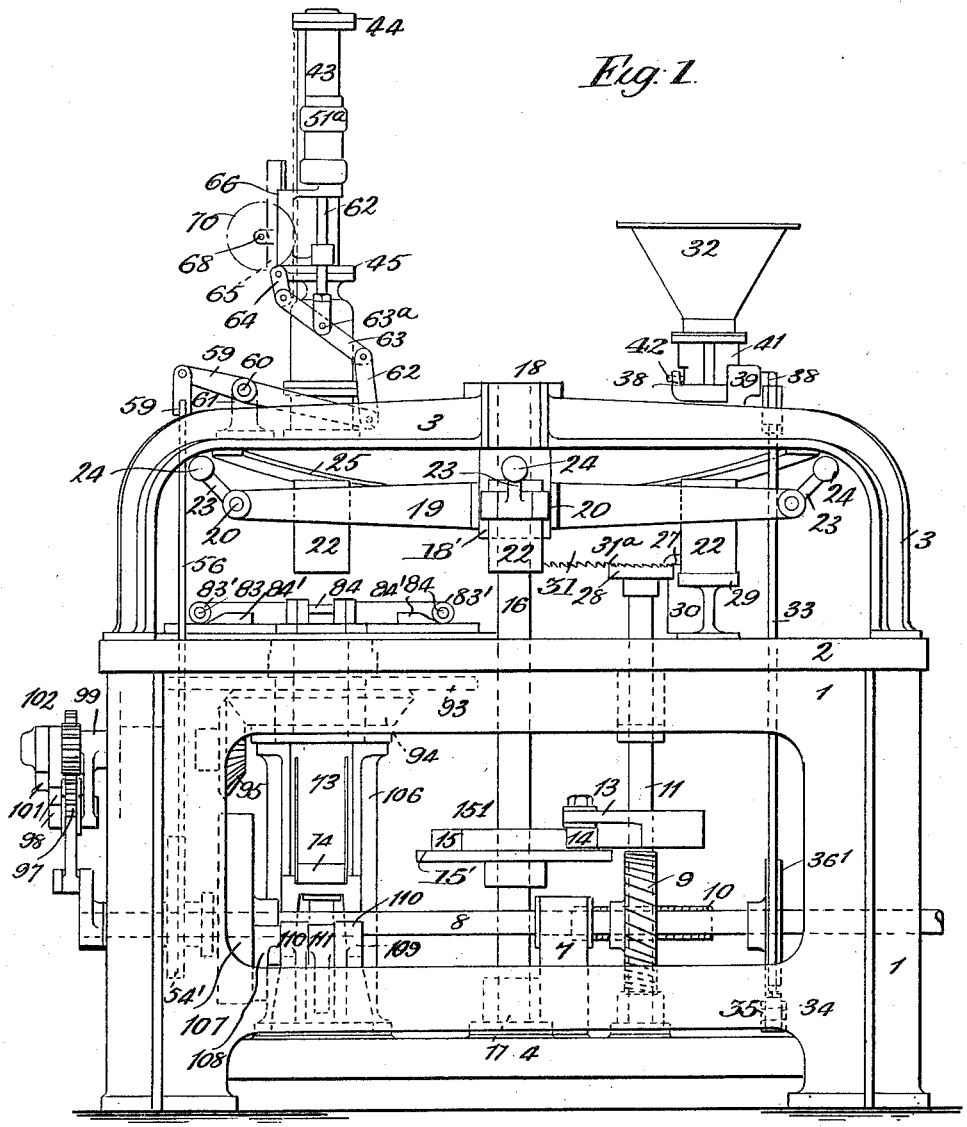
Figure 2:
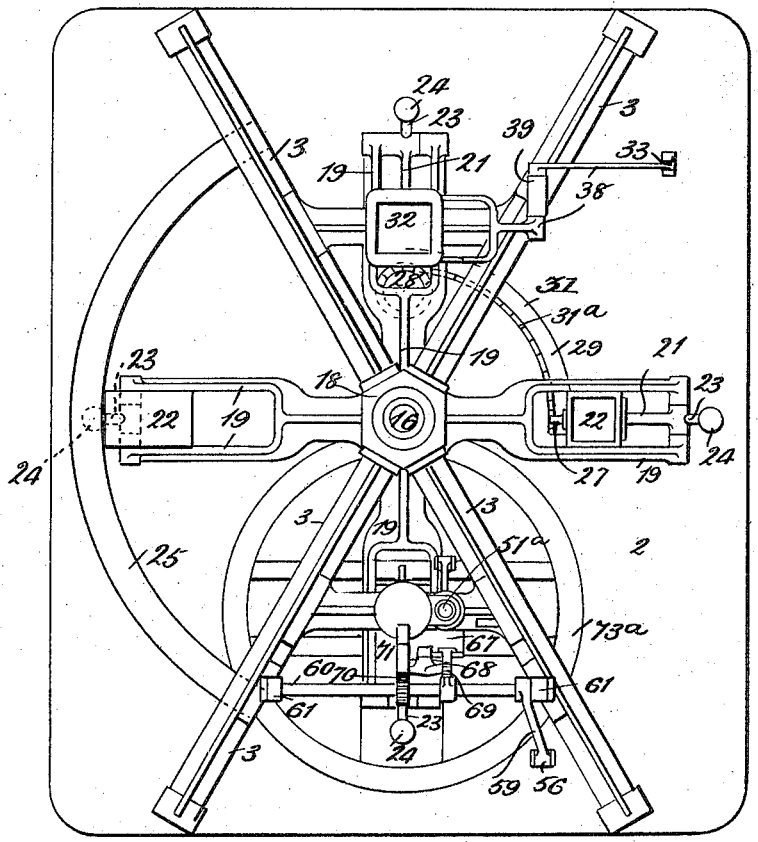
Figure 3:
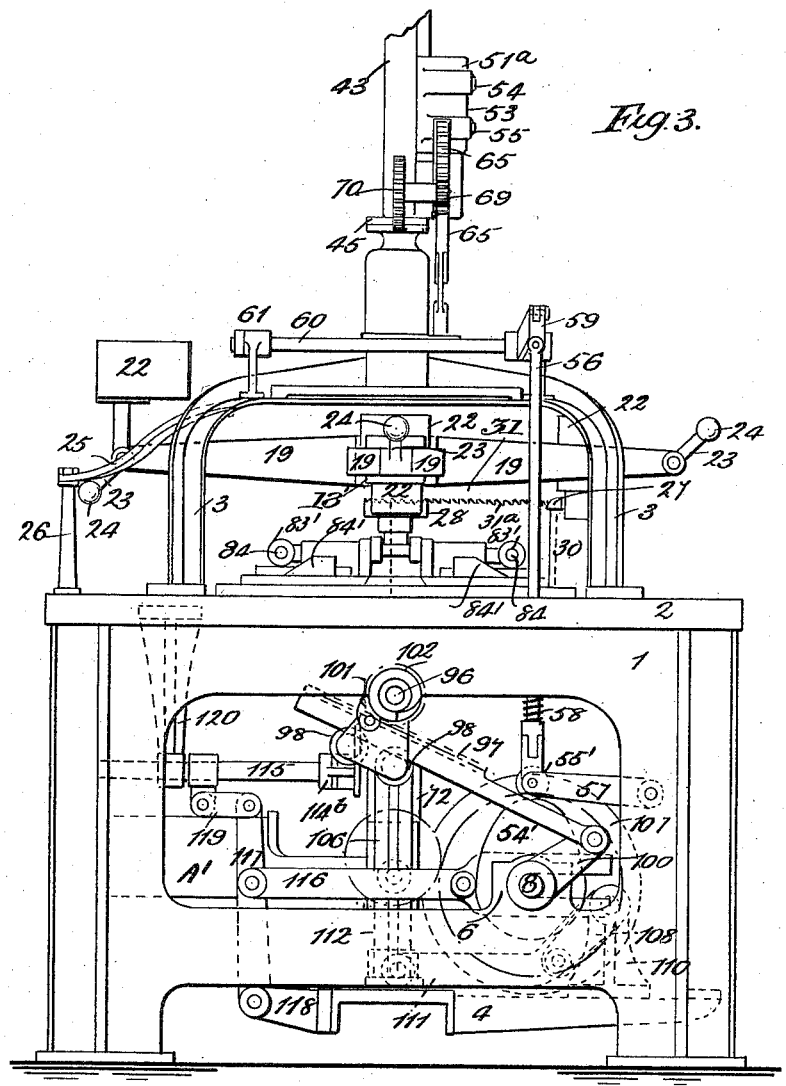
Figure 4:
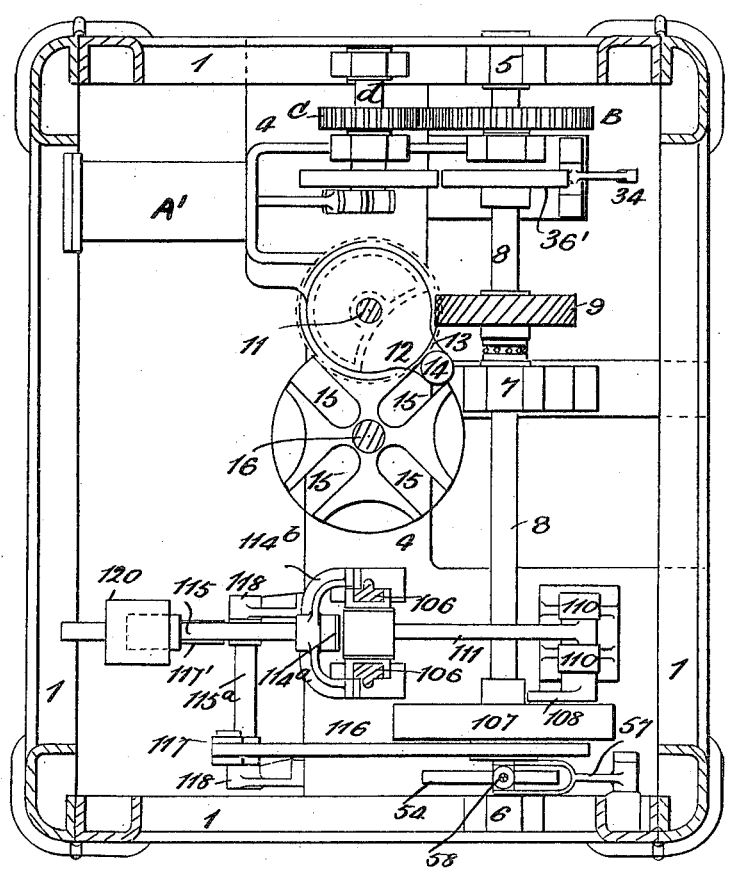
Figure 5:
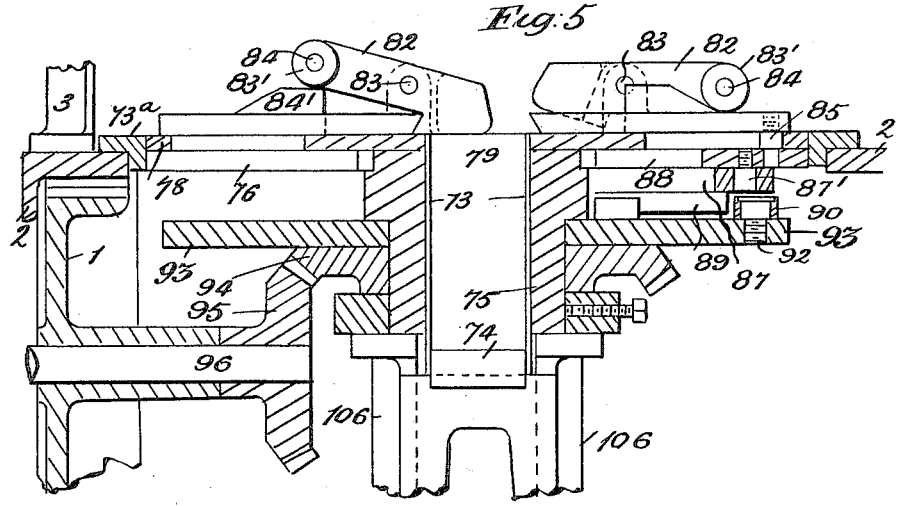
Figure 6:
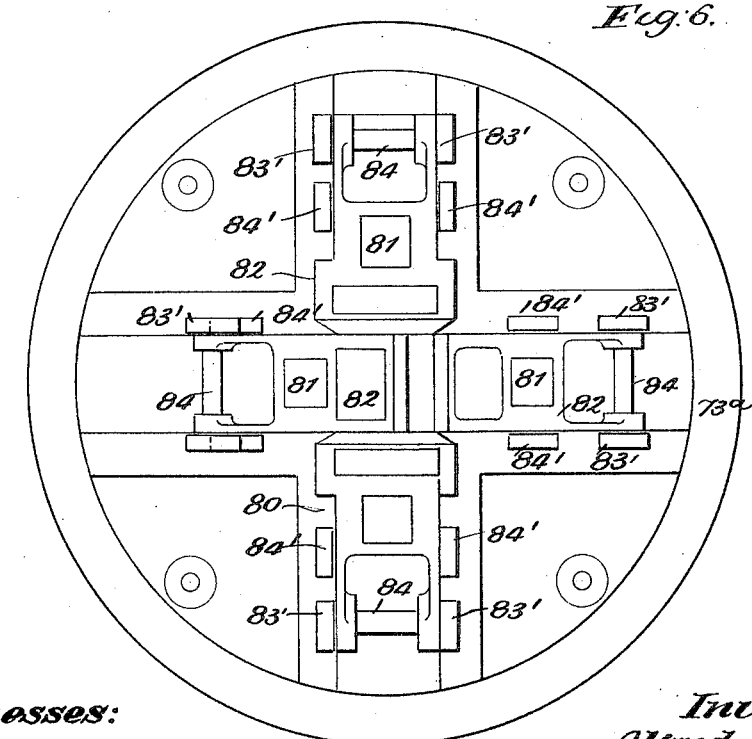
Figure 7:
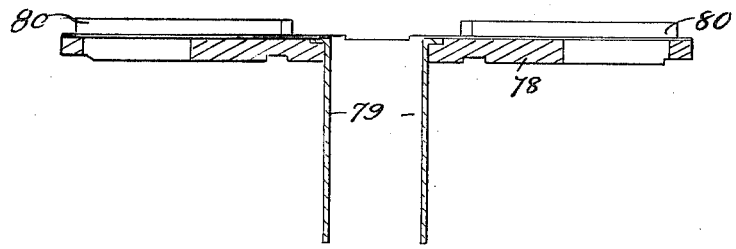
Figure 8:
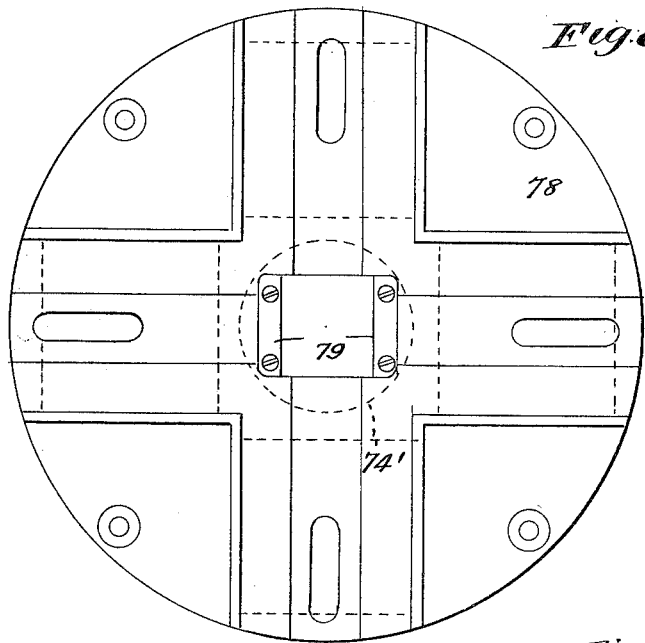
Figure 9:
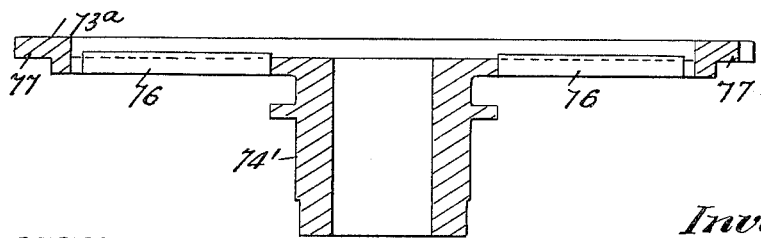

Figure 1. is a side elevation of the machine. Fig. 2. is a plan. Fig. 3. is a front view. Fig. 4. is a sectional plan showing the driving mechanism of the various parts. Fig. 5 is a section to a large scale of the folding mechanism. Fig. 6 is a plan. Fig. 7. is a section of part of the folding mechanism. Fig. 8. is a plan of the part shown in Fig. 7. Fig. 9. is a sectional view of another part of the folding mechanism. Fig. 10. is a transverse section of one of the folders. Fig. 11. is a plan showing the operating members of the folders. Fig. 12. is a side elevation partly in section showing the operating means for the receptacles for the bag. Fig. 13. is a plan of the same. Fig. 14. is a side elevation of the filling funnel and the mechanism operating same. Fig. 15. is a side elevation of the means for ejecting the finished packet and the operating mechanism therefor. Fig. 16. is a side part of the body supporting the packet during the closing thereof. Fig. 17. is a side elevation of the means for removing the bag from the receptacle. Fig. 18. is a side view. Fig. 19. is a vertical longitudinal section. Fig. 20. is a sectional plan on line A A Fig. 17. Fig. 21. is a plan of the upper end of the cylinder.

Referring to the accompanying drawings, 1 indicates frames supporting a plate 2 upon which are mounted the various folding and operative members of the machine. The plate 2 has belted or otherwise secured to it, a bracket 3, and connected to the frames 1 is a member 4.

5, 6, 7 indicate bearings formed respectively upon the frames 1 and secured to the member 4, and which bearings support a shaft 8 provided at one end with the usual fast and loose pulleys not shown. The shaft 8 has secured to it a pinion 9 engaging a second pinion 10, secured to a vertical shaft 11, and which shaft has secured to it a disk 12, provided with an arm 13, Figs. 1 and 4, and which arm carries a roller 14, designed to engage recesses or slots 15 formed in a second disk $15^1$, mounted upon a second vertical shaft 16, supported at its lower end in a foot step bearing 17 and at the upper end in a bearing $18^1$ in the bracket 3 before referred to. The two disks are arranged after the manner of the well known Geneva stop mechanism, and by their employment the intermittent rotation of the shaft 16 is secured and at the same time any accidental movement of said shaft is avoided.

Keyed or otherwise attached to the upper end of the shaft 16, is a body 18 to which are bolted or otherwise secured a number of arms 19, see Figs. 1, 2, 3, 12, and 13, and which arms at their other ends are bifurcated and have pivotally mounted thereon by means of pins 20 other arms 21 attached to receptacles 22 and which arms at their outer ends are provided with projections 23 carrying rollers 24, and which rollers as the body 18 rotates, come into contact with a cam surface 25, supported by columns 26, and having its ends attached to the aforesaid bracket 3. The contour of the cam surface is such that the receptacles, which normally under the influence of gravity are disposed in the vertical plane, are brought into a horizontal position, and while in this position, the empty packet is placed therein. The placing of the packets in the receptacles may be accomplished either by hand, or the machine may be arranged in close proximity to the bag or carton maker, so that the bags are discharged therefrom into the receptacle. The receptacles 22 are provided with a projection 27, which when the packet is in position ready for filling, rests upon the periphery of a serrated disk 28, mounted upon the upper end of the aforesaid shaft 11. By this means, the packet during the time it is receiving its contents, is subjected to a vibratory motion, which assists in effecting the shaking down or settling of the said contents. The receptacle at such time as it is being charged, is closed at its lower end by means of a surface 29, formed at the upper end of the bracket 30, and which bracket extends from the point where the packet receives its contents, to the second or any other point of rest. The bracket is provided with a projecting ledge or wall 31, provided with teeth or serrations 31$^a$, as shown in Figs. 1, 2, 3, 12 and 13, and the projection 27 aforesaid engages these teeth as the receptacle is moved along so that the packet is subjected to a further vibratory movement, which further tends to insure the settling down of the contents.

The filling of the packet is effected by means of the funnel 32, which funnel as shown in Figs. 1, 2 and 14 is caused to move in the vertical plane to bring the lower end into the mouth of the packet by means of a rod 33, connected at one end to a lever 34, pivotally mounted at 35, in a bracket 36, attached to the aforesaid member 4. A cam 36$^1$ on the main shaft engages a roller 37, on the lever 34 and the rod 33 at its upper end is attached to a lever 38, mounted on a bracket 39, attached to a bearer 40. The bearer 40 has bolted or otherwise secured to it, one side of a bracket 41, in which is slidably mounted, the lower end of the aforesaid funnel 32. A second bearer 40$^a$, serves to support the other limb of the bracket 39, both the bearers 40 and 40$^a$, being secured to the main bracket 3, before referred to. The bracket where it receives the end of the funnel is slotted and passing through the slots, are pins such as 42, which pins are engaged by the ends of the lever 38, which is bifurcated at its inner end.

The packet when filled is transported in the receptacle 22, to the folding devices, but prior to the operation of said folding devices, the packet is removed from the said receptacle. The removal of the packet is effected by the mechanism illustrated in Figs. 1, 2, 3, and Figs. 17 to 21. The mechanism just referred to, comprises a cylinder 43, supported at its lower end from the bracket 3, and which cylinder is closed at the top, by means of a cover 44, and at the bottom by means of a second cover 45, provided with a stuffing box, and gland 46, through which passes a rod 47. The rod 47 at its lower end is provided with a foot 48, which entering the mouth of the bag comes into contact with the contents, and bearing thereon, pushes the bag out of the receptacle 22. The rod 47, at its upper end, is provided with a piston 48$^1$, and communicating with the upper end of the cylinder 43, is a port 49, a second port 50, communicating with the lower end. These ports permit the entry of compressed air to the cylinder, for the purpose of raising or lowering the rod. In order to control the admission and escape of the compressed air, I employ a valve 51, see Fig. 19, which valve is disposed within a second cylinder 51$^a$, with which cylinder the aforesaid ports 49, 50 communicate. The valve comprises a double piston attached to a rod 52, and air is admitted to the cylinder at a point between the two pistons, by means of the port 53. Exhaust ports 54, 55 are provided for the escape of the air.

As it is desired that only the initial movement of rod 47, shall be effected by means of the valve 51, I provide means whereby the said valve is first operated from the main shaft of the machine, and thereafter its operation is effected by means associated with the said rod itself. For the purpose I employ a cam 54$^1$, mounted upon the main shaft of the machine, see Figs. 3 and 4 and resting upon the said cam is a roller 55$^1$, attached to the lower end of a rod 56. A radius bar or link 57 is provided to keep the lower end of the rod in position, said link being pivotally secured to the inside of one of the frames 1. The upper end of the rod 56, which is held down by means of a spring 58, is connected to a lever 59, mounted on a spindle 60, supported in brackets 61, upon the main bracket 3. The lever 59, at its inner end is connected to a link 62 which link, at its upper end is connected to a second lever 63, pivotally mounted at 63$^a$, upon the end of rod 52. The opposite end of the lever 63, has connected to it, one end of a link 64, which link at its opposite end is connected to a toothed rack, 65, moving in guides 66, see Figs. 18 to 20, upon the extension 67 of the cylinder 43. Bolted or otherwise secured to the aforesaid extension 67, is a bracket 68, in which is mounted a spindle 68$^1$, having at its ends pinions 69, 70. Of the pinions just referred to, 69 engages the rack 65, while the second pinion 70, engages a rack 71, attached to a collar 72, Fig. 17, and which collar is, attached to the rod 52. Guides are provided upon the cylinder for the rack 71. By means of the arrangement described, the initial movement of the rod 52, is controlled by means of the valve, and thereafter the admission of the compressed air is controlled by means of the rod itself. While the compressed air for operating the plunger 48, on rod 47 may be obtained from any convenient source, I prefer to provide a compressor upon the machine itself. Such compressor may be of any convenient type, and is indicated generally in Figs. 3, 4 by $A^1$. The said compressor is operated from the main shaft of the machine through pinions B, C, secured respectively to the said shaft, and to the crank shaft $d$, of the compressor. A magazine for the compressed air may be provided, and suitable connections are provided between said reservoir or the compressor and the valve chamber or cylinder $51^a$. These connections are not shown but their arrangement will be readily apprehended by those skilled in the art. The packet when thrust out of the receptacle, is brought into a position ready for the folding operations, and during these operations, the packet is supported by the vertically reciprocating body 72, see Figs. 1, 15 and 16, upon which the said packet is retained by the plates 73, secured to a plate 74, removably attached to said body so that it may be readily removed and another placed thereon, when dealing with packets of different sizes. The folders are mounted upon the plate 2 in a manner such that they can when so desired be readily removed and another set substituted. By this means it is possible with the one machine to deal with different sized packets the changes for the said packet being readily effected with a minimum expenditure of time and labor. As shown in Figs. 1, 2, 3, 5, 6, 7, 8 and 9, I form a circular perforation in the plate 2, and located within this perforation is a circular disk or plate $73^a$ having a boss $74^1$ upon the underside, in which is formed a square perforation 75.

76 indicates slots formed in the plate $73^a$ which plate itself is supported in the opening in the plate 2, by means of the peripheral flange 77. Resting upon the plate $73^a$ is a second plate 78, having a central perforation of square outline, in which perforations are disposed the vertical plates 79, which plates extend downward into the perforation of the aforesaid plate 73. The plate 78, also slotted to correspond with the slots in plate $73^a$, and in addition to the said slot, the plate 78, has formed upon its upper surface, projections in which are placed guides 80, for the folders. The folders comprise bodies, formed in two parts 81, 82 connected together by means of a pin 83 see Figs. 5, 6 and 10. Of the parts referred to 81 forms a slipper sliding between the guides 80, while the second portion 82, which actually performs the folding operations, is so arranged that it may rock or tilt upon the aforesaid pivot. This tilting of the part 82 is effected by means of a roller $83^1$ mounted upon the pin 84 carried at the rear end of part 82 and which roller is designed to come into contact with the inclined surface $84^1$, see Figs. 1, 3, 5, 6 and 10, whereupon the part 82 is caused to assume a position as shown in Fig. 5. This movement of the part 82 takes place as the folder comes into contact with the upstanding edge of the packet and under the influence of the inclined surface 84 the folder is brought down simultaneously with its forward movement and turns the side of the packet downward with it.

The operation of the folders is effected by means of the pins 85 attached to the parts 81 and which pins pass through the slots in the respective plates $73^a$, 78. The pins 85 engage slots 86 formed in the outer ends of levers 87, Figs. 5 and 11, which levers are pivotally mounted at $87^1$ upon a disk 88. Each of the levers at its slotted end is provided with a cam plate 89 said cam plate being engaged to move the levers in one direction by means of rollers 90 and in the other direction by means of rollers 91. The rollers 90, 91 are mounted upon pins 92 tapped into a disk 93 revolubly mounted upon the aforesaid boss 74 of plate 73, see Fig. 5. Secured in any convenient manner to the disk 93 is a bevel wheel 94 with which engages a second wheel 95 mounted upon a spindle 96 which spindle is intermittently actuated by means of the rack 97, Figs. 1 and 3. The rack is supported at its upper end by means of rollers 98 mounted upon the plate 99 suspended from spindle 96 and the rack is caused to reciprocate by means of the crank 100 secured to one end of the main shaft 8. The rack 97 engages a pinion freely mounted on spindle 96 and which pinion is provided with a pawl 101 engaging a ratchet wheel 102 secured to the said spindle 96.

The packet during the closing operations is supported between plates 73 attached to the sides of a body 74 before referred to as being removably secured to a slipper 72. The plates 73 enter the perforation in the boss on plate $73^a$ aforesaid in Figs. 5 and 9 and are disposed upon opposite sides thereof to the aforementioned plates 79. The plates 79 and 73 form as it were a chamber into which the filled packet is thrust by the pneumatically operated plunger. The slipper 72 is arranged to move between vertically disposed guides 106 and its operation is effected by means of a cam race in a disk 107 secured to the main shaft, see Figs. 1, 3, 4, and 15, and with which race engages a roller attached to an arm 108 mounted upon a spindle 109 supported in brackets 110 mounted upon the member 4 of the frame. The spindle 109 has secured to it an arm 111 and said arm is connected to the slipper by means of a link 112. As the packet is thrust into position for closing the end it is received between the plates 79 and 73 as aforesaid the latter plates at this period being raised to receive it until their upper edges are level with the under surface of the folders, and when the packet is in such a position that the top thereof projects ready for the operation of the folders. After the folding has been effected the packet is discharged from between the plates 73 and this is effected by means of the horizontally reciprocating boss 114 having a plate 114<sup>a</sup> thereon, arranged upon a rod 115 and during its movement to pass between the plates 73 pushing the packet from between them. The packet when discharged may be received by a chute or receptacle. The movement of the rod 115 is effected by means of a rod 116 straddling the main shaft at its inner end and at the outer end connected to a lever 117 mounted upon a spindle 115<sup>a</sup> carried by brackets 118, see Figs 3, 4, and 15. The spindle 115<sup>a</sup> at its opposite end is provided with an arm 117<sup>1</sup>. The lever 117 at its upper end is connected through a link 119 to the aforesaid rod 115 sliding in guides 114<sup>b</sup> and the bracket 120 secured to the underside of plate 2. The rod 116 is actuated by a cam race cut in the opposite face of the aforesaid disk 107 actuating the support for the packet during the closing operation.

The operation of the machine is as follows: A receptacle 22 is brought by means of the projection 23 thereon engaging the cam track 25 into a horizontal position and while in this position the bag or carton is placed therein. As the receptacle 22 passes to its next position of rest the said receptacle is brought into the vertical position and comes to rest below the filling funnel 32. The material, tea for example, is discharged into the funnel from a suitable weighing machine which as it forms no part of the present invention is not further described. When the receptacle comes to rest its lower end is closed by the surface 29 on the bracket 30 and while it is at rest the funnel is lowered so that its mouth enters the packet and so insures the proper delivery of the material. Simultaneously with the discharge of the material into the packet the receptacle and with it the packet are subject to a vibratory action by means of the projection 27 on the said receptacle engaging the teeth on the disk 28 attached to the upper end of shaft 11. When the filling has been accomplished the funnel is raised and the packet transported to its next position of rest. During its movement from the last position the end of the packet is supported by the surface 29 and at the same time the packet is subjected to a further vibratory action due to the passage of the aforesaid projection over the teeth 31<sup>a</sup> formed upon the inner circumference of the surface 29. The packet in its next position of rest is beneath the foot 48 on the rod 47 and at this point the compressed air is admitted to the cylinder 43 causing the rod 47 to descend and the foot 48 to enter the packet and come into contact with the contents pressing thereon and pushing the bag out of the receptacle into the chamber formed by the aforesaid plates 79 and 73, the foot 48 as it approaches its lowest position acting to compress the contents of the packet. The presser foot 48 is then withdrawn and the support carrying the packet is lowered until the top of the contents of the packet is on a level with the undersurface of the folding bodies. The folders are then successively brought into operation in any desired sequence and when they have completed their operation the packet is discharged by being pushed out from between the plates 73 by the horizontally reciprocating body 114 the plate 114<sup>a</sup> thereon pushing said packet from between said plates 73.

Claims.

1. A machine for filling and closing packets comprising a number of open ended receptacles to hold the packets each arranged to swing in the vertical plane, an intermittently actuated rotating body carrying said receptacles, means for turning the receptacles from the vertical to the horizontal positions, means for filling the packets, means for removing the packets from the receptacles, means for presenting the packets to the folding devices, folding devices removably mounted upon the machine, means for retaining the packet during the closing operations, and means for discharging the filled packet.

2. A machine for filling and closing packets comprising a number of open ended receptacles to hold the packets each arranged to swing in the vertical plane, an intermittently actuated rotating body carrying said receptacles, projections on said receptacles, a cam path engaging said projections, means for filling the packets, means for removing the packets from the receptacles, means for presenting the packets to the folding devices, folding devices removably mounted upon the machine, means for retaining the packet during the closing operations, and means for discharging the filled packet.

3. A machine for filling and closing packets comprising a number of open ended receptacles to hold the packets each arranged to swing in the vertical plane, an intermittently actuated rotating body carrying receptacles, projections on said receptacles, a cam path engaging said receptacles, a fixed body forming a closure for the lower end of the receptacles when in the vertical position, means for vibrating said receptacles during the filling of the packets, means for filling the packets, means for removing the packets from the receptacles, means for presenting the packets to the folding devices, folding devices removably mounted upon the machine, means for retaining the packet during the closing operations, and means for discharging the filled packet.

4. A machine for filling and closing packets comprising a number of open ended receptacles to hold the packets each arranged to swing in a vertical plane, an intermittently actuated rotating body carrying said receptacles, projections on said receptacles, a cam path engaging said receptacles, a second projection on said receptacles, a rotating body having ratchet teeth thereon engaging said projection on the receptacle, means for filling the packets, means for removing the packets from the receptacles, means for presenting the packets to the folding devices, folding devices removably mounted upon the machine, means for retaining the packet during the closing operations, and means for discharging the filled packet.

5. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections, a second projection on said receptacles, a rotating body having ratchet teeth thereon engaging said projection, a fixed body forming a closure for the receptacle during the filling and vibrating operations, ratchet teeth upon said body engaging the second projection on the receptacle, means for filling the packets, means for removing the packets from the receptacles, means for presenting the packets to the folding devices, folding devices removably mounted upon the machine, means for retaining the packet during the closing operations, and means for discharging the filled packet.

6. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections to bring said receptacles into the horizontal position, a second projection on said receptacles, a rotating body having ratchet teeth thereon engaging said projection to vibrate the receptacle and the packet therein, a fixed body forming a closure for the receptacle during the filling and vibrating operations, ratchet teeth upon said body engaging the second projection on the receptacle to vibrate said receptacle a second time, a vertically reciprocating funnel for filling the packet, means for removing the packet from the receptacle, folding devices for closing the packet removably mounted upon the machine, means for retaining the packets during the closing of the packet, and means for discharging the filled packets.

7. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections to bring said receptacles into the horizontal position, a second projection on said receptacles, a rotating body having ratchet teeth thereon engaging said projection, to vibrate the receptacle and the packet therein, a fixed body forming a closure for the receptacle during the filling and vibrating operations, ratchet teeth upon said body engaging the second projection on the receptacle to vibrate said receptacle a second time, a vertically reciprocating funnel for filling the packet, a plunger for removing the packet from the receptacle, folding devices for closing the packet removably mounted upon the machine, means for retaining the packets during the closing of the packet, and means for discharging the filled packets.

8. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections to bring said receptacles into the horizontal position, a second projection on said receptacles, a rotating body having ratchet teeth thereon engaging said projection to vibrate the receptacle and the packet therein, a fixed body forming a closure for the receptacle during the filling and vibrating operations, ratchet teeth upon said body engaging the second projection on the receptacle to vibrate said receptacle a second time, a vertically reciprocating funnel for filling the packet, means for removing the packet from the receptacle, means for closing the packet comprising a plate removably attached to the bed of the machine carrying guides pivotally mounted, folding bodies reciprocating in said guides, a roller upon each body, a cam surface in the path of said roller, means for retaining the packet during the folding operations, and means for discharging the closed packet.

9. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections to bring said receptacles into the horizontal position, a second projection on said receptacles, a rotating body having ratchet teeth thereon engaging said projection to vibrate the receptacle and the packet therein, a fixed body forming a closure for the receptacle during the filling and vibrating operations, ratchet teeth upon said body engaging the second projection on the receptacle to vibrate said receptacle a second time, a vertically reciprocating funnel for filling the packet, means for removing the packet from the receptacle, means for folding the packet comprising a plate removably attached to the bed of the machine carrying guides, pivotally mounted folding bodies reciprocating in said guides, a roller upon each body, a cam surface in the path of said roller, projections on said bodies, slotted levers engaging said projections, cam surfaces upon said levers, rollers engaging said cam surfaces and an intermittently rotating body carrying said rollers, means for retaining the packets during the folding operations, and means for discharging the closed packets.

10. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections to bring said receptacles into the horizontal position, a second projection on said receptacles, a rotating body having ratchet teeth thereon engaging said projection to vibrate the receptacle and the packet therein, a fixed body forming a closure for the receptacle during the filling and vibrating operations, ratchet teeth upon said body engaging the second projection on the receptacle to vibrate said receptacle a second time, a vertically reciprocating funnel for filling the packet, means for removing the packet from the receptacle, means for closing the packets comprising a plate removably attached to the bed of the machine carrying guides, pivotally mounted folding bodies reciprocating in said guides, a roller upon each body, a cam surface in the path of said roller, projections on said bodies, slotted levers engaging said projections, cam surfaces upon said levers, rollers engaging said cam surfaces and an intermittently rotating body carrying said rollers, a perforation in said plate, a vertically reciprocating body for supporting the packet disposed beneath said opening, vertical plates for retaining the packet attached to said reciprocating body, and entering said opening and means for discharging the closed packet.

11. A machine for filling and closing packets comprising a number of open ended receptacles to hold the packets each arranged to swing in the vertical plane, a horizontally disposed intermittently actuated rotating body carrying said receptacles, projections on said receptacles, a cam path engaging said projections to bring said receptacles into the horizontal position, a second projection on said receptacles, a rotating body having ratchet teeth thereon engaging said projection to vibrate the receptacle and the packet therein, a fixed body forming a closure for the receptacle, during the filling and vibrating operations, ratchet teeth upon said body engaging the second projection on the receptacle to vibrate said receptacle a second time, a vertically reciprocating funnel for filling the packet, means for removing the packet from the receptacle, means for closing the packets comprising a plate removably attached to the bed of the machine carrying guides, pivotally mounted folding bodies reciprocating in said guides, a roller upon each body, a cam surface in the path of said roller, projections on said bodies, slotted levers engaging said projections, cam surfaces upon said levers, rollers engaging said cam surfaces and an intermittently rotating body carrying said rollers, a perforation in said plate, a vertically reciprocating body to support the packet disposed beneath said opening, vertical plates attached to said reciprocating body to retain the packet, and entering said opening, a horizontally reciprocating body for expelling the closed packets.

ALFRED PARR.

Witnesses:
JOHN CHARLES WATERMAN,
HAROLD VICTOR TAYLOR.

Copies of this patent may be obtained for five cents each, by addressing the "Commissioner of Patents, Washington, D. C."